United States Patent Office.

WILLIAM N. BLAKEMAN, JR., OF NEW YORK, N. Y.

PROCESS OF TREATING PIGMENTS AND PRODUCT PRODUCED BY SUCH PROCESS.

SPECIFICATION forming part of Letters Patent No. 702,178, dated June 10, 1902.

Application filed August 6, 1901. Serial No. 71,094. (No specimens.)

*To all whom it may concern:*

Be it known that I, WILLIAM N. BLAKEMAN, Jr., of the borough of Manhattan, in the city, county, and State of New York, have invented a new and useful Process of Treating Pigments and a new and useful Product Produced by Such Process, which invention is fully set forth in the following specification.

The object of this invention is to treat pigments used in the manufacture of paints in such a manner that when ground in an oil vehicle the paint compound formed will dry quickly without the addition of commercial liquid driers.

In the art of painting it is the usual practice to grind a pigment in an oil vehicle and to add to the compound just prior to spreading it as a paint turpentine-japan or similar commercial liquid drier.

I have discovered that if a pigment be first treated by combining therewith a lead salt and a manganese salt and then ground in an oil vehicle the compound formed will exhibit quick-drying properties when spread as a paint without the addition of any commercial liquid drier.

In carrying out my invention I first thoroughly combine with a pigment (white lead, zinc-white, or other pigment) both a lead salt and a manganese salt, and to accomplish this either the pigment or the salts, or both, should be in a liquid or wet condition. The most satisfactory way is to dissolve the metallic salts in a suitable solvent—say water—and then thoroughly saturate the pigment with the solution, intimately commingling with agitation. I then evaporate the solvent, leaving the pigment in a dry state, with the metallic salts combined with each of its particles. To form a paint compound, I then grind the dry pigment in a suitable oil vehicle, and the paint so produced will dry quickly without the addition of a commercial liquid drier.

The lead salt used may be any of the lead acetates; but I prefer to use the solution of subacetate known as "Goulard's extract." The manganese salt may be either the acetate, sulfate, borate, carbonate, benzoate, or chlorid, preferably the acetate or the sulfate. The lead and manganese salts used may be dissolved separately and then combined with the pigment in any order desired, or they may be dissolved in one solvent and the pigment saturated with this solution.

The proportions to be used of the various ingredients will depend upon the result desired. If two hundred parts of white lead be treated as above described with one-fifteenth of one per cent. of manganese acetate and five per cent. of lead subacetate and then ground in one hundred parts of raw linseed-oil, the compound formed will when spread as a paint dry in three and one-half hours without the addition of any commercial liquid drier, and if ten per cent. of boiled oil be used in forming the compound the time of drying will be further reduced. If one hundred parts of zinc-white be treated as above described with one-tenth of one per cent. of manganese sulfate and five per cent. of lead subacetate and then ground in one hundred parts of raw linseed-oil, the compound formed will when spread as a paint dry in about four hours without the addition of any commercial liquid drier. One hundred parts of zinc-white so treated will be found equal in all respects to two hundred parts of white lead, as the manganese and lead salts not only act as driers, but also impart "spreading power" to the zinc-white—a quality lacking in this pigment. When white lead is used, this pigment will also be found to have additional spreading power after treatment as above described.

Zinc-white when treated by my process will also form a quick-drying compound with the non-drying fatty oils, such as cotton and sunflower oils, and the latter may be used as a vehicle, either alone or combined with a drying oil. Thus if one hundred parts of zinc-white be treated as above described with three-fourths of one per cent. of manganese acetate and five per cent. of lead subacetate and then ground in one hundred parts of boiled sunflower-oil the paint formed will dry in about seven hours without the addition of a commercial liquid drier, and if fifteen to twenty per cent. of boiled linseed-oil be incorporated in forming the compound the time of drying will be reduced to four or five hours.

As my process and the product produced thereby entirely obviate the necessity for the use of commercial liquid driers now used in painting, it is evident that a great saving is effected. The small proportions of lead and manganese salts used are comparatively inexpensive, whereas the cost of the ordinary liquid drier in the proportions now employed is a considerable item in painting.

In my application for patent filed October 31, 1899, Serial No. 735,438, I have claimed, broadly, a process for combining driers with pigments; but in this present application I desire to specially claim the use of lead salts and manganese salts, as hereinbefore described.

Having thus fully described my invention, I claim—

1. The process herein described, which consists in combining with a pigment, by the aid of a liquid, a lead salt and a manganese salt substantially as described, and then evaporating the liquid.

2. The process herein described, which consists in combining with a pigment, by the aid of a liquid, a lead salt and a manganese salt substantially as described; then evaporating the liquid; and then grinding the pigment in oil.

3. The process herein described, which consists in first making a solution of lead salt and a manganese salt substantially as described; then saturating a pigment with said solution; and then evaporating the solvent.

4. The process herein described, which consists in first making a solution of a lead salt and a manganese salt substantially as described; then saturating a pigment with said solution; then evaporating the solvent; and then grinding the pigment in oil.

5. The process herein described, which consists in first combining with a pigment, by the aid of a liquid, a lead salt and a manganese salt substantially as described; then evaporating the liquid; and then grinding the pigment in a vehicle composed of raw oil and boiled oil.

6. The process herein described, which consists in first making a solution of a lead salt and a manganese salt substantially as described; then saturating a pigment with this solution; then evaporating the solvent; and then grinding the pigment in a vehicle composed of raw oil and boiled oil.

7. The process herein described, which consists in first combining with a zinc-white pigment, by the aid of a liquid, a lead salt and a manganese salt, substantially as described; and then evaporating the liquid.

8. The process herein described, which consists in first combining with a zinc-white pigment, by the aid of a liquid, a lead salt and a manganese salt, substantially as described; then evaporating the liquid; and then grinding the pigment in oil.

9. The process herein described, which consists in first combining with a zinc-white pigment, by the aid of a liquid, a lead salt and a manganese salt substantially as described; then evaporating the liquid; and then grinding the pigment in a non-drying fatty oil.

10. The process herein described, which consists in first combining with a zinc-white pigment, by the aid of a liquid, a lead salt and a manganese salt substantially as described; then evaporating the liquid; and then grinding the pigment in a vehicle composed of a drying oil and a non-drying fatty oil.

11. As a new article of manufacture, a dry pigment having a lead salt and a manganese salt combined therewith.

12. As a new article of manufacture, a dry pigment composed of zinc-white having a lead salt and a manganese salt combined therewith.

WM. N. BLAKEMAN, JR.

Witnesses:
FRANCIS P. REILLY,
RUDOLPH PRAAST.